Apr. 10, 1923.
J. A. BARTOSZ
1,451,317
FLAX PULLER ATTACHMENT FOR BINDERS
Filed Dec. 12, 1921 2 sheets-sheet 1
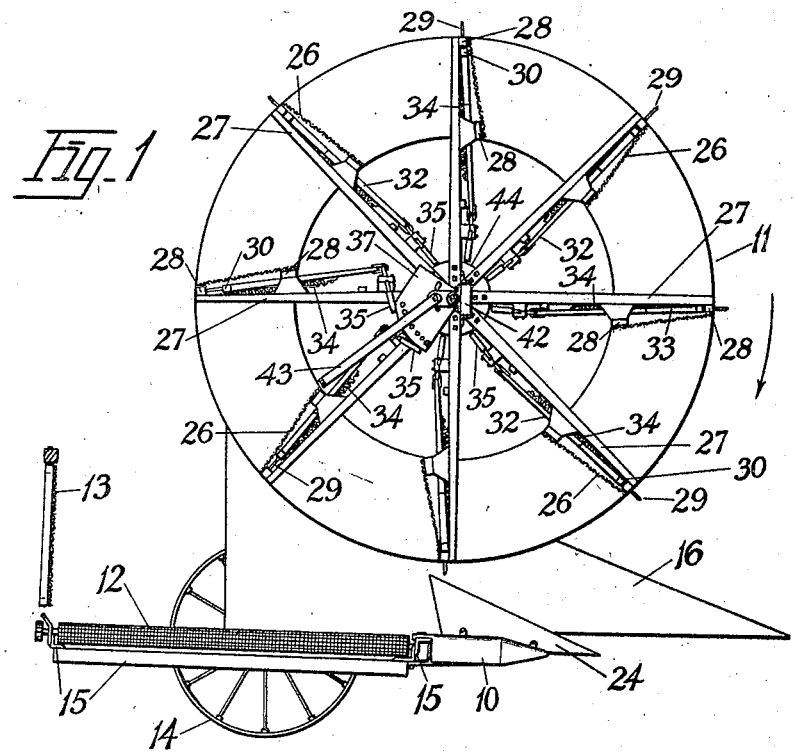
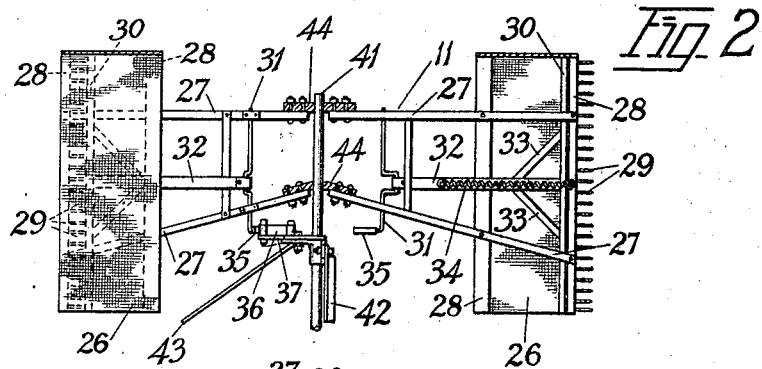
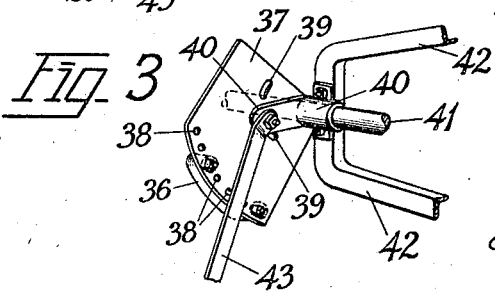
WITNESS
H. Savage.
INVENTOR
J. A. Bartosz.
BY
C. E. Goldberg.
ATTORNEY.

Apr. 10, 1923.
J. A. BARTOSZ
1,451,317
FLAX PULLER ATTACHMENT FOR BINDERS
Filed Dec. 12, 1921   2 sheets-sheet 2
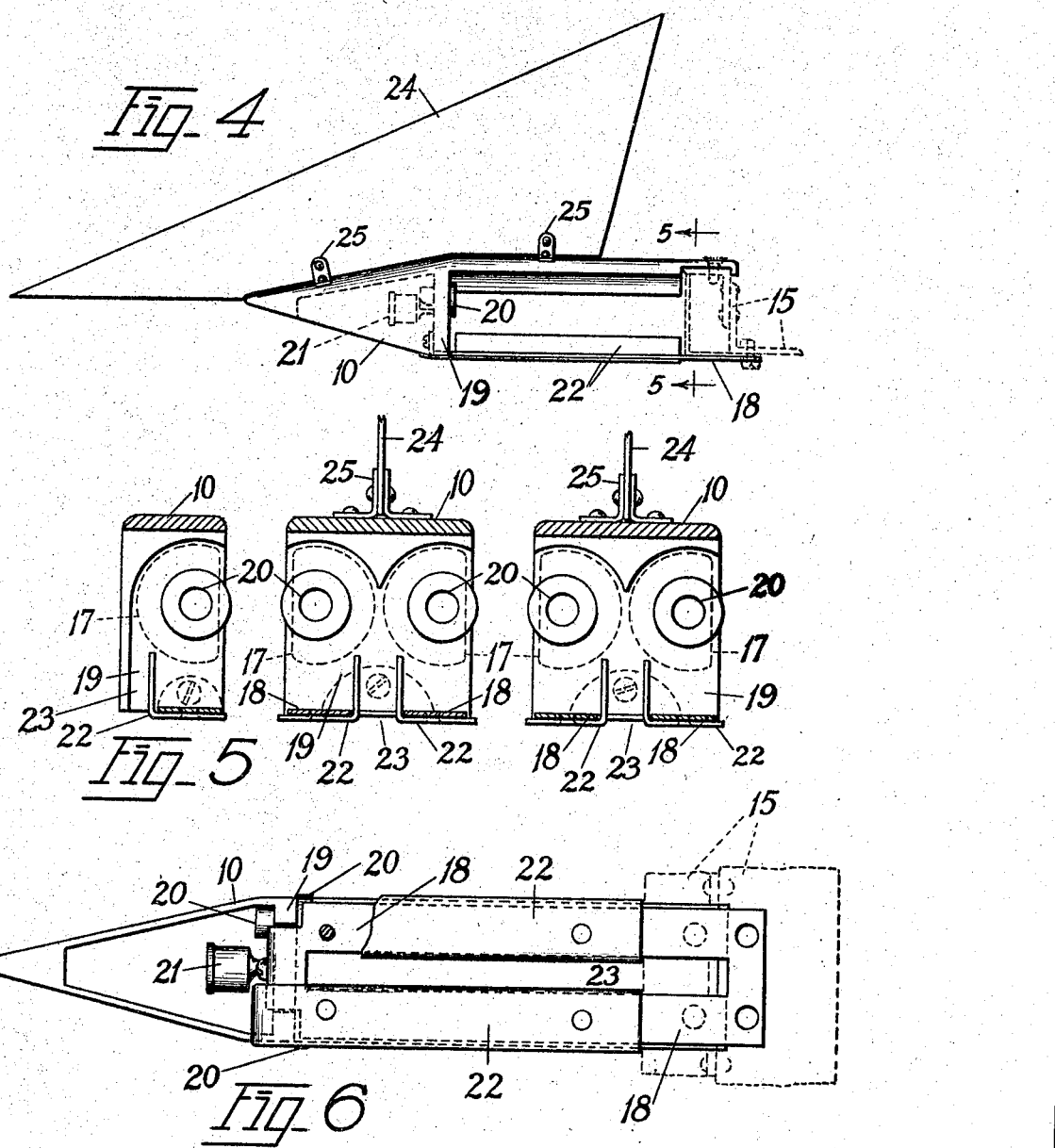
WITNESS
*J.F. Savage.*
INVENTOR
J. A. Bartosz
BY *C.B. Goldberg.*
ATTORNEY.

Patented Apr. 10, 1923.

1,451,317

UNITED STATES PATENT OFFICE.

JOSEPH A. BARTOSZ, OF TURNER, OREGON.

FLAX-PULLER ATTACHMENT FOR BINDERS.

Application filed December 12, 1921. Serial No. 521,884.

*To all whom it may concern:*

Be it known that I, JOSEPH A. BARTOSZ, a citizen of the United States, residing at Turner, in the county of Marion and State of Oregon, have invented a new and useful Flax-Puller Attachment for Binders, of which the following is a specification.

My invention relates to improvements in flax puller attachments for binders in which the guards for the flax pulling rollers are provided with scrapers and guiding plates; and in which the reel is equipped with disappearing raker teeth.

The objects of my invention are: to scrape any adhering stones, dirt, and stalks from the rubber rollers; to deliver the flax stalks in good order to the reel; to give the reel a good grip on the flax stalks; and to disengage the stalks at the right moment from the reel.

I attain these objects with the mechanism illustrated in the accompanying drawings, in which:

Fig. 1 is a side elevation of the flax puller attachment separated from the binder, with the observer standing in the place of the binder.

Fig. 2 is a horizontal cross section through the reel in Fig. 1.

Fig. 3 is a detail of the cam mechanism which causes the raker teeth to withdraw.

Fig. 4 is a side elevation of the roller guard with the guiding plate on top and the scraper underneath.

Fig. 5 is a section through some of the roller guards in Fig. 4 along the line 5—5.

Fig. 6 is a bottom view of one of the roller guards.

Similar numerals refer to similar parts throughout the several views.

The general principle of flax pullers may best be explained by a reference to Fig. 1. Revolving rubber rollers mounted in the pointed guards 10 take hold of the standing flax stalks, pull them out by the roots, and then throw them up into the path of the revolving reel 11, which latter deposits said stalks on the conveyor belt 12, to be finally delivered to the binder. A canvas screen 13 checks the inclination of any stalk to fly beyond the rear edge of the conveyor belt. One end of the frame work which supports the recited elements is carried by the wheel 14, the other end is attached to the binder. The latter furnishes the motive power for the reel, the revolving rollers and the conveyor belt. The frame work is designated by the numerals 15. The large triangular wing 16 at the end of the frame aids in guiding the stalks to the rollers. All of this, however, has already been described in detail in a prior patent application filed by me on April 8, 1921 under the title "Flax puller attachment for binders", Serial No. 459,556. The present application refers to features newly invented to remedy defects in the prior construction.

Heretofore the guards 10 shown in Figs. 4, 5 and 6 were left open at the bottom. In uprooting the stalks, the rubber rollers 17, indicated by the dotted lines in Fig. 5, were thus exposed to the pelting action of sand and stones which quickly deteriorated the rubber. Furthermore the rollers were apt to become coated with dirt and fragments of rocks, which prevented a firm grip on the stalks; also some of the stalks would insist on winding around and covering the rollers. To remedy all of these defects I inclose the open space underneath the rollers with a slotted plate 18, one end of said plate being attached to the frame 15, and the other to a cross wall 19 in the front end of the guard 10, said cross wall also furnishing the bearings 20 for the rubber rollers 17. (The grease cup 21 lubricates the bearings 20). Angle irons 22 are riveted to plate 18 and reach with one leg through the slot 23 so that the sharp edge approaches the rubber roller. Any dirt or stalk adhering to the rubber roller is thus scraped off and falls to the ground through the slot 23.

Another improvement is the triangular guiding plates 24 held to the top of the guards by the brackets 25. Interference of the stalks ascending from one roller pair with those of an adjoining roller pair is thereby effectively prevented and orderly delivery to the reel 11 is assured.

The reel structure also has been greatly improved. The canvas wings 26 are supported on arms 27 and cross braces 28 as usual, but in addition thereto raker teeth 29 are slidably mounted in the cross braces which support the wings at the circumference. Each set of raker teeth is secured in a bar 30, and actuated from the crank shaft 31 (Fig. 2) by means of the connecting rod 32. The corner braces 33 add rigidity to the structure. A tension spring 34 holds the teeth normally extended beyond the circumferential edge of the wings 26.

To withdraw the teeth at the proper moment a finger 35 on the crank shaft 31 strikes against a cam 36 on the cam plate 37. So long as the finger rides on the cam the teeth remain withdrawn, thereby releasing the stalks which latter drop on the conveyor belt 12. To advance or retard the reciprocatory motion of the teeth, the cam plate is provided with a plurality of holes 38 (Fig. 3), which permit an adjustment for the cam 36, and also with additional holes 39 whereby the position of the cam plate 37 on the bracket 40 may be changed. The bracket 40 is constructed to act as bearing for the shaft 41, and affixed to a frame 42 which extends back to the binder. A brace rod 43, (Figs. 1, 2, 3), which also extends back to the binder, helps to support the bracket 40.

The shaft 41 is driven from the binder in any suitable manner. The arms 27 are affixed to the shaft by means of the hubs 44. It may be noted in passing that the arms 27 on the binder-side of the reel are set slantingly toward the medial line at the axis so that no extra space outside the reel is needed for the cam mechanism.

I claim:

1. In an attachment for binders the combination of a guard, adapted to hold rubber rollers, a protecting plate secured to the under side of the guard, scrapers for the rubber rollers attached to said protecting plate, guiding plates on top of the guards to deliver the flax stalks in an orderly manner to the binder, a reel revolubly mounted above the guards, and raker teeth attached to the circumference of the reel.

2. In a device of the character described, the combination of a guard adapted to hold rubber rollers, a slotted plate to protect the rubber rollers at the under side of the guard, angle irons riveted to the slotted plate, said angle irons extending with one leg through the slot and forming scrapers for the rubber rollers, guiding plates on top of the guard, a reel above the guard, and raker teeth projecting from the circumference of the reel.

3. In a device of the character described, the combination of a guard containing rubber rollers, a protecting plate at the under side of the guard, scrapers for the rubber rollers attached to the protecting plate, a triangular guiding plate mounted on top of the guard, brackets holding the triangular plates to the guard, a reel above the guard, and raker teeth projecting from the circumference of the reel.

4. In a device of the character described, the combination of a guard containing rubber rollers, a reel revolubly mounted above the guard, raker teeth projecting from the circumference of the reel, and means to impart a reciprocatory motion to the raker teeth.

5. In a device of the character described, the combination of a guard containing rubber rollers, a reel revolubly mounted above the guard, said reel comprising arms mounted in pairs and extending radially from the axis, cross braces between each pair of arms, canvas wings stretched over the cross braces, raker teeth slidably mounted in the cross braces at the circumference of the reel, and means to withdraw said raker teeth momentarily after having passed the guards.

6. In a device of the character described, the combination of a guard containing rubber rollers, a reel revolubly mounted above the guard, raker teeth slidably mounted at the circumference of the reel, a cam mechanism, and means between the cam mechanism and the raker teeth to effect a withdrawal of said raker teeth.

7. In a device of the character described, the combination of a guard containing rubber rollers, a reel revolubly mounted above the guards, raker teeth projecting from the circumference of the reel, a crank shaft mounted in the reel structure near the axis thereof, a connecting rod between the raker teeth and the crank shaft, a tension spring to hold the teeth in outward position, a finger at the end of the crank shaft extending toward the axis of the reel, a cam adjustably mounted at the axis in the path of said finger to withdraw the raker teeth when the finger rides on the cam.

Signed by me at Portland, Oregon, this 6th day of December, 1921.

JOSEPH A. BARTOSZ.